(12) United States Patent
Kumachi

(10) Patent No.: US 9,523,999 B2
(45) Date of Patent: Dec. 20, 2016

(54) ADAPTER AND INFORMATION PROCESSING UNIT

(71) Applicant: Yumi Kumachi, Kanagawa (JP)

(72) Inventor: Yumi Kumachi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 544 days.

(21) Appl. No.: 13/767,441

(22) Filed: Feb. 14, 2013

(65) Prior Publication Data

US 2013/0215568 A1    Aug. 22, 2013

(30) Foreign Application Priority Data

Feb. 17, 2012  (JP) ................................ 2012-032271

(51) Int. Cl.
| | |
|---|---|
| H05K 7/00 | (2006.01) |
| H05K 5/00 | (2006.01) |
| G06F 1/16 | (2006.01) |
| G06F 1/18 | (2006.01) |

(52) U.S. Cl.
CPC ................. *G06F 1/16* (2013.01); *G06F 1/187* (2013.01)

(58) Field of Classification Search
CPC ........................... G11B 33/126; G11B 33/123
USPC ........................................ 361/679.01–679.09
See application file for complete search history.

(56) References Cited

U.S. PATENT DOCUMENTS

| | | | |
|---|---|---|---|
| 2005/0105265 A1* | 5/2005 | Petrov et al. ................. 361/685 |
| 2010/0165564 A1* | 7/2010 | Lu ............................ 361/679.35 |
| 2011/0090637 A1 | 4/2011 | Hiyama | |
| 2012/0136477 A1* | 5/2012 | Merrow ............... G11B 17/225 |
| | | | 700/218 |

FOREIGN PATENT DOCUMENTS

| | | |
|---|---|---|
| JP | 60-54495 | 3/1985 |
| JP | 2-129798 | 10/1990 |
| JP | 6-47881 | 6/1994 |
| JP | 2001-256769 | 9/2001 |
| JP | 2011-086346 | 4/2011 |

OTHER PUBLICATIONS

Japanese official action dated Aug. 5, 2015 in corresponding Japanese Patent Application No. 2012-32271.

* cited by examiner

*Primary Examiner* — Jerry Wu
(74) *Attorney, Agent, or Firm* — Cooper & Dunham LLP

(57) ABSTRACT

An adapter to mount, in a housing, a device having a connector includes a tray to which the device is fixed, a chassis into which the tray is inserted from one direction, fixed in the housing, a connector substrate on which a connecter is mounted, attached to a back portion of the chassis in the one direction, the connector being connected to the connector of the device while movable in a plane orthogonal to the one direction, and a first conductive elastic element attached on one side of a first wall portion of the chassis, extending in the one direction, in which the tray is pressed onto a second wall portion of the chassis opposing the first wall portion while the tray is inserted into the chassis and the device connector is connected to the connector of the substrate.

8 Claims, 6 Drawing Sheets

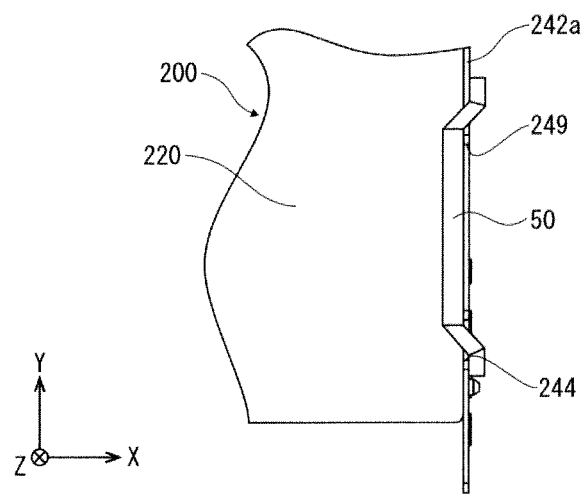
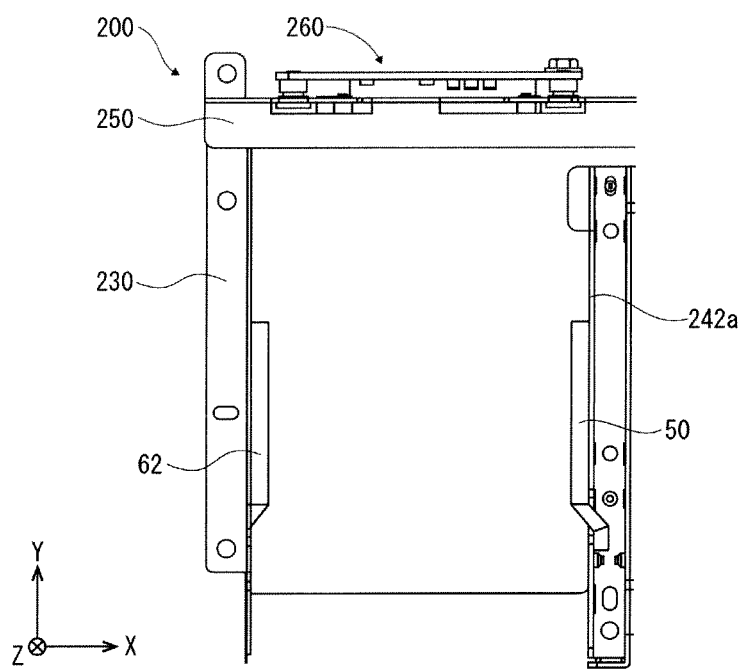

ADAPTER AND INFORMATION PROCESSING UNIT

CROSS REFERENCE TO RELATED APPLICATION

The present application is based on and claims priority from Japanese Patent Application No. 2012-32271, filed on Feb. 17, 2012, the disclosure of which is hereby incorporated by reference in its entirety.

BACKGROUND OF THE INVENTION

Field of the Invention

The present invention relates to an adapter to mount a device with a connector in a housing and an information processing unit using such an adapter.

Description of the Related Art

A large-volume data memory as hard disc or optical disc is indispensable for an information processing unit such as information device or control device. In general the information processing unit incorporates a hard disc drive (hereinafter, HDD) including a hard disc and a driver to read and write data from/to the hard disc or an optical disc drive for data read and write from/to an optical disc as a CD (compact disc) or DVD (digital versatile disc).

A hot plug is a known way to mount an HDD module in the housing of the information processing unit while in operation, for instance.

One example of the hot plug is to insert the HDD module into the opening of a chassis connected to the unit body to connect a connector of the chassis with that of the HDD. This type of the hot plug can reduce the number of connectors and cables and the cost therefor and realizes a simple connection of the HDD module and information processing unit.

Japanese Patent Application Publication No. 2011-86346 discloses a low-cost adapter to mount a device having a connector in a housing and attach/detach a connector of the HDD module to/from that of the device and including a tray to which the device is fixed, a holder fixed to the housing and into which the tray is inserted, and a substrate on which a connector is mounted to connect to the device connector.

Japanese Patent Application Publication No. 2001-256769 discloses a hot plug device including a plug-in unit constituting a part of an electronic device to insert into a container of a device body. Inserted into the container, this hot plug device is pressed onto the inner wall of the container and the plug-in unit point-contacts a protrusion provided in the inner wall to reduce the vibration of the plug-in unit.

For the above hot-plug connection, it is necessary to provide a chassis with an opening larger than the outer form of the HDD module and dispose the HDD module close to the opening for the purpose of easily inserting the HDD module into the opening. However, with a large clearance between the chassis and the opening, the HDD cannot stably conduct data communication due to vibration, which may cause a communication error. Further, if there is not a sufficient creeping distance between the HDD module and the chassis, static electricity is likely to enter in the module. Furthermore, in a case where the HDD module is not stably grounded, the HDD may be damaged or impaired by EMI (electromagnetic interference) in addition to static electricity.

SUMMARY OF THE INVENTION

The present invention aims to provide an adapter to easily insert or extract an HDD module into/from the housing of a device having a connector and improve the tolerance of the HDD module against static electricity, EMI, and vibration.

According to one aspect of the present invention, an adapter to mount, in a housing, a device having a connector, includes a tray to which the device is fixed, a chassis into which the tray is inserted from one direction, fixed in the housing, a connector substrate on which a connecter is mounted, attached to a back portion of the chassis in the one direction, the connector being connected to the connector of the device while movable in a plane orthogonal to the one direction, and a first conductive elastic element attached on one side of a first wall portion of the chassis, extending in the one direction, wherein the tray is pressed onto a second wall portion of the chassis opposing the first wall portion while the tray is inserted into the chassis and the device connector is connected to the connector of the substrate.

BRIEF DESCRIPTION OF THE DRAWINGS

Features, embodiments, and advantages of the present invention will become apparent from the following detailed description with reference to the accompanying drawings:

FIG. 11 shows an example of how a conductive elastic element is mounted; and

FIG. 12 shows another example of how a conductive elastic element is mounted.

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

Figure 1:
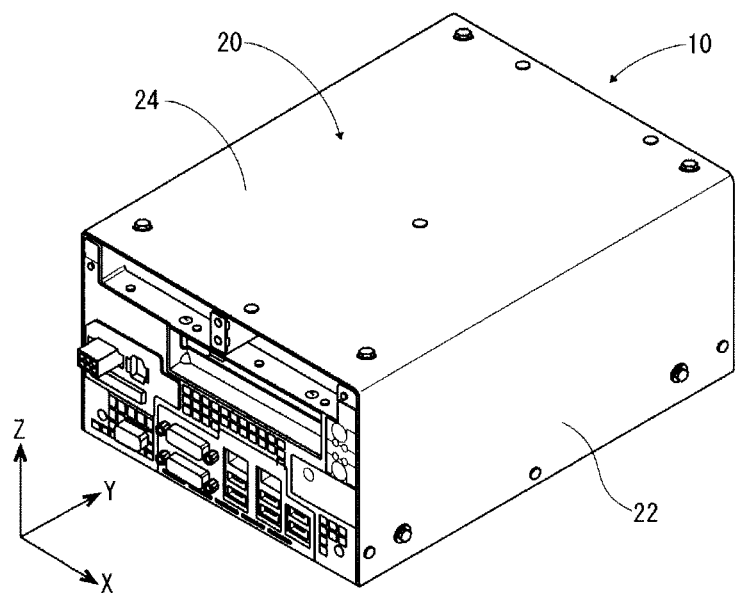
FIG. 1 schematically shows the structure of an information processing unit according to one embodiment of the present invention.

One embodiment of the present invention is described with reference to FIG. 1 to FIG. 12. FIG. 1 shows the exterior of an information processing unit 10. Herein, a direction in which an HDD module 300 (FIG. 6) is inserted is defined to be Y axis, a direction orthogonal to the Y axis is defined to be X axis, and a direction orthogonal to both X and Y axes is defined to be Z axis.

Figure 2:
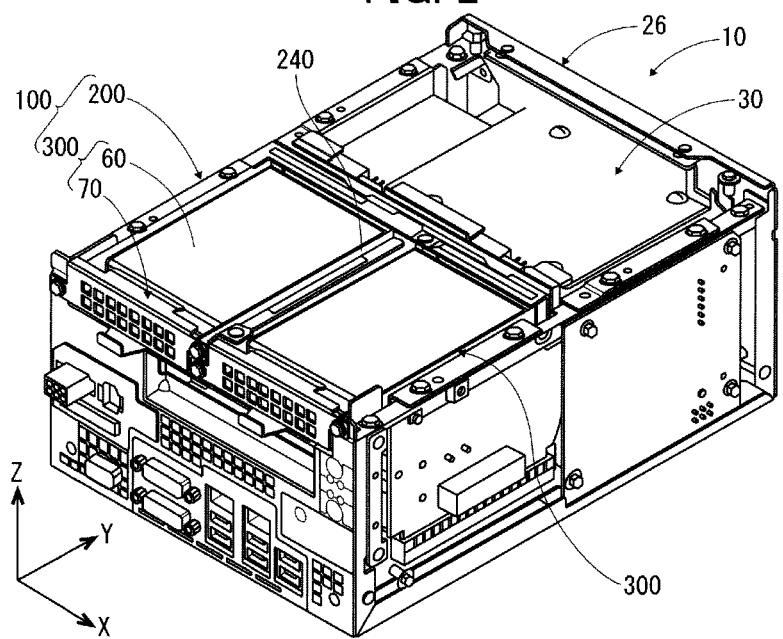
FIG. 2 is a perspective view of the information processing unit in FIG. 1 excluding a part of the housing.

In FIGS. 1, 2 the information processing unit 10 comprises a housing 20, a body 30 contained in the housing 20, an HDD 60 attached to the body 30 via an adapter 100.

The housing 20 includes a not-shown bottom plate, a pair of side plates 22, a top plate 24, and a frame 26 to which these plates are attached. The bottom plate, side plates 22, and top plate 24 are thin plates with through holes and fixed with screws to the bottom, side, and top faces of the frame 26 via the through holes, respectively.

The body 30 in FIG. 2 is placed inside the frame 26 constituting the housing 20. Although not shown, the body 30 of a cuboid shape long on the Y axis includes a mother board, a power supply unit, and a cooling fan. Various elements are attached to the front and back panels of the body 30 such as a graphic port to connect a monitor, a connector to an input device as a keyboard, USB connectors, a microphone terminal, a headphone terminal, a serial port, a parallel port, and a LAN connector.

The adapter 100 is mounted at the top of the front half (−Y axis side) of the body 30, and includes a chassis 200, and a tray 70 constituting a part of the HDD module 300.

Figure 3:
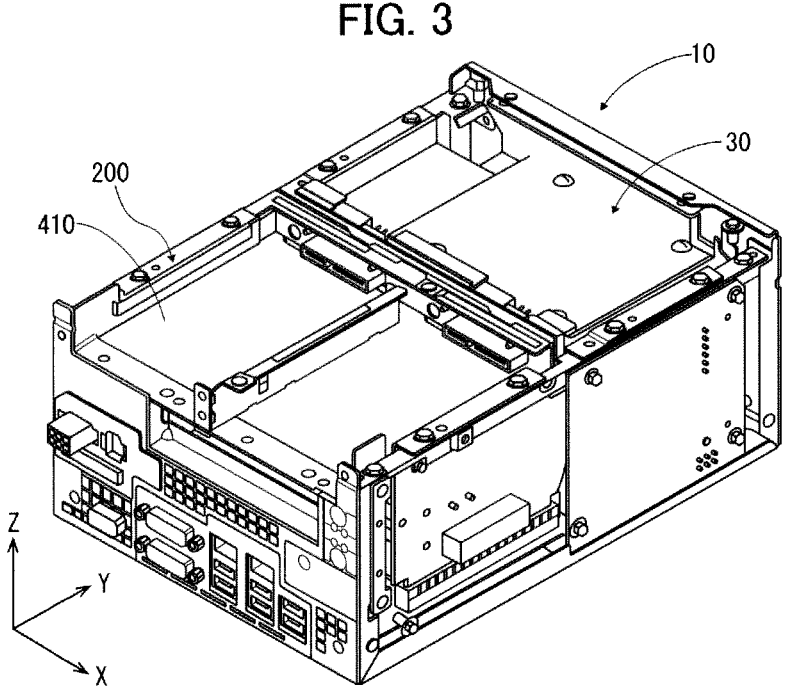
FIG. 3 is a perspective view of the information processing unit in FIG. 2 excluding an HDD module.

The chassis 200 in FIG. 3 is integrally mounted at the top of the front half of the body 30 so that the front end of the chassis 200 and that of the front panel are placed almost at the same position.

Figure 4:
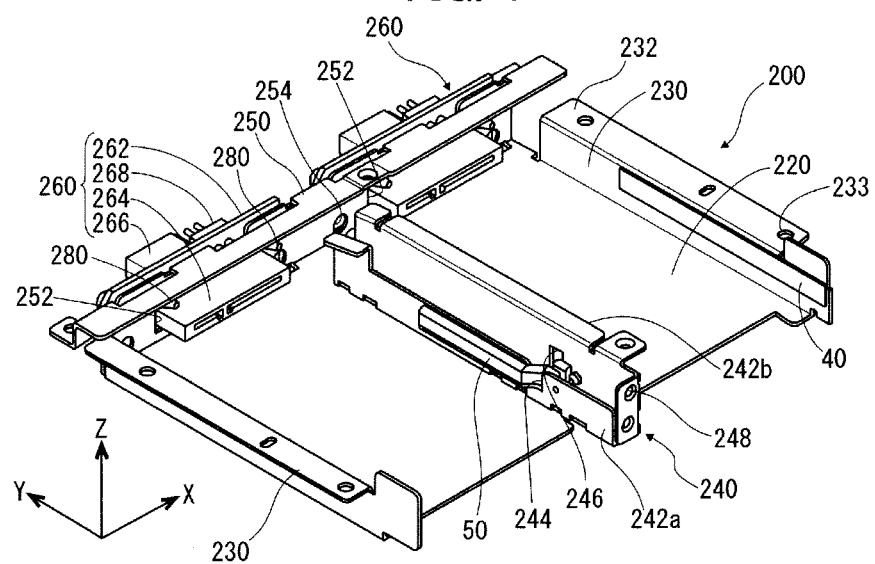
FIG. 4 is a perspective view of a chassis of the information processing unit in FIG. 1.

The chassis 200 is made of a thin metal plate with conductivity, bent by sheet-metal processing, for example. As shown in FIG. 4, the chassis 200 includes a bottom plate 220 parallel to a horizontal plane, a pair of side plates 230 standing on the bottom plate 220 from the front end (−Y axis side) to near the back end, a back plate 250 standing on the back end of the bottom plate 220, and a partition 240 extending along the Y axis at the X axis center of the bottom plate 220. The chassis 200 can be produced by welding separate elements instead of sheet-metal processing, for example.

The bottom plate 220 is rectangular and has not-shown through holes at the X axis center arranged with an interval along the Y axis. The partition 240 is fixed on the bottom plate 220 with screws via the through holes.

One of the side plates 230 includes, from the back end to the front end, a bent portion as an installation plate 232 parallel to a horizontal plane. Three through holes, for example, are formed in the installment plate 232 with a certain interval along the Y axis. The installment plate 232 or side plate 230 is fixed with screws to a part of the frame 26 via the through holes 23. The other of the side plates 230 is symmetric to a YZ plane passing the center of the chassis 200 on the X axis and of the same shape as the one side plate.

About an upper half of the back plate 250 is bent forward and the back plate 250 includes, below the bent portion, two rectangular opening 252 with a spacing along the X axis. The holes are long along the X axis and formed near both sides of the partition 240. Also, four through holes 254 are provided on both sides of the two openings 252, and four guide pins 280 with a tapered top end, protruding forward are provided at the top end of the back plate 250 above both sides of each of the two openings 252.

Connector substrates 260 are disposed in the two openings 252, respectively and each include a circuit board 262 as a rectangular thin plate long along the X axis, a connector 264 (FIG. 6) fixed at the front end of the circuit board 262, inserted through the openings 252 to connect with the HDD connector 64 of a later-described HDD module 300, a connector 266 at the back end of the circuit board 262 to connect with a signal cable from the mother board, and a connector 268 to connect with a power supply cable from the power supply unit. The connector substrate 260 is connected to the chassis 200 via a not-shown floating nut inserted into the through holes 254 of the back plate 250 and movable in the XZ plane. Japanese Patent Application Publication No. 2011-86346, for example, discloses an example of the structure of the connector substrate 260 and a floating nut in detail.

The partition 240 is a thin conductive metal plate bent by sheet-metal processing, for example, and made of a bottom plate 245 (FIG. 5) and a pair of opposing medium plates 242a, 242b standing on both ends of the bottom face 245 along the X axis. It has a U-shaped XZ cross section. Alternatively, the partition 240 can be produced by welding separate elements.

The bottom plate 245 is a thin plate extending from before the front end of the bottom plate 220 to near the rear end thereof and includes through holes arranged separately along the Y axis in association with the through holes of the bottom plate 220. It is fixed on the bottom plate 220 with screws via the through holes.

An upper half of the rear end of one medium plate 242a in FIG. 4 is bent toward −X axis, and the height of the bent portion is higher than the rest of the plate. The medium plate 242a includes, near the longitudinal center, a notch 244 from the top end to the center of the height as in FIG. 5.

The top end of the other medium plate 242b is bent toward +X axis from the back end to near the front end, and it is almost the same in height as the back end of the medium plate 242a. The medium plate 242b includes an opening 246 opposing the notch 244. A part of the front end thereof is bent toward −X axis and becomes flush with the medium plate 242a. Further, two through holes 248, for example, are separately formed along the height thereof in the bent portion of the medium plate 242b. The tray 70 of the HDD module 300 is attached to the medium plate 242a in the chassis 200 with screws through the through holes 248.

Further, as shown in FIG. 4, conductive tapes 40 and conductive elastic elements 50 are adhered on the chassis 200.

The conductive tapes 40 are placed on the inner faces of the pair of side plates 230 from the front (−Y axis) end to slightly over the center, so that the top ends thereof are approximately at the same height as the bent portions of the side plates 230, and the bottom ends are above the bottom plate 220.

Figure 5:
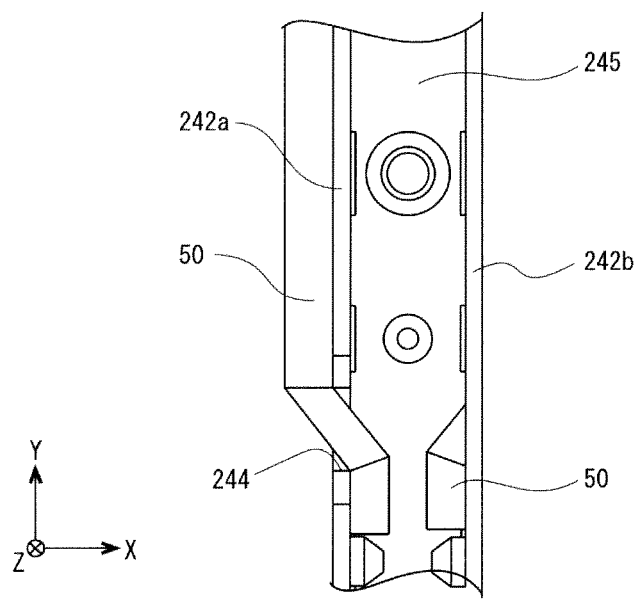
FIG. 5 is an enlarged plan view of a part of the chassis in FIG. 4.

The conductive elastic elements 50 (one of them not shown in FIG. 4) have a rectangular XZ cross section and extend on the outer side faces of the pair of medium plates 242a, 242b along the Y axis from behind the center to the front. The top ends of the conductive elastic elements 50 are almost at the same height as the top end of the medium plate 242a except for the back end portion. One end (−Y axis) of each conductive elastic element 50 is bent inward and inserted into the notch 244 and opening 246 of each of the medium plates 242a, 242b to extend along the inner side faces of the medium plates 242a, 242b, as shown in FIG. 5.

In FIG. 2 two HDD modules 300 are separately mounted in the chassis 200 on both sides of the partition 240. Only one HDD module 300 on −X axis side is described in the following, referring to FIGS. 6 to 10.

Figure 6:
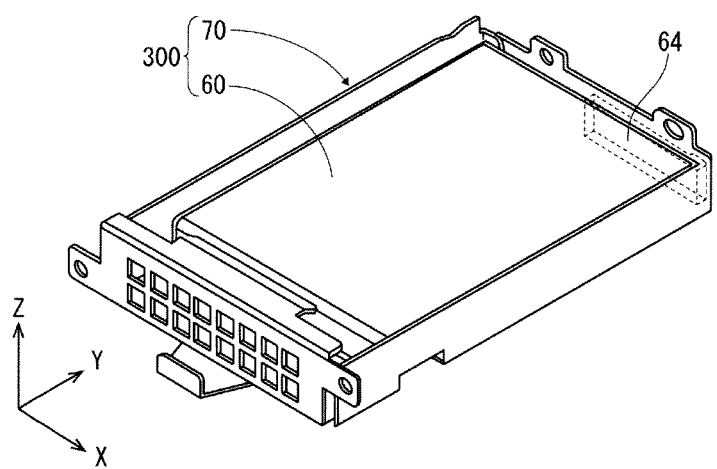
FIG. 6 is a perspective view of the HDD module of the information processing unit in FIG. 1.

In FIG. 6 the HDD module 300 includes the HDD 60 and the tray 70.

The HDD 60 is a cuboid with a height smaller than a width and a depth, and contains a not-shown ejectable or retractable magnetic disc. A HDD connector 64 is provided on a side surface on the +Y axis to connect with the connector substrate 260.

Figure 7:
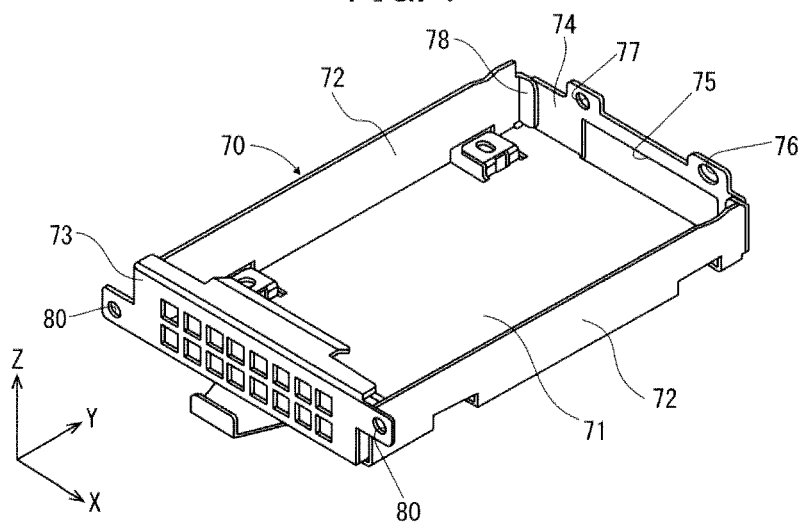
FIG. 7 is a perspective view of a tray of the HDD module in FIG. 6.
Figure 9:
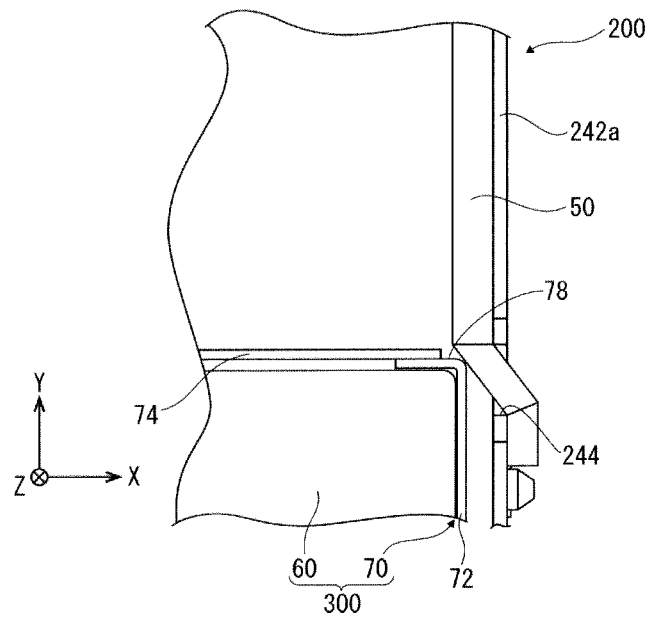
FIG. 9 shows the insertion of the HDD module to the tray.

In FIG. 7 the tray 70 is a rectangular box with an open top and slightly larger than the HDD 60. It is made of a thin metal plate, bent by sheet-metal processing, for example, and includes a rectangular bottom plate 71, a pair of side plates 72, a front plate 73, and a back plate 74 standing on the back end of the bottom plate 71. The pair of side plates 72 stand on the bottom plate 71, and each include at the rear end an inwardly folded portion 78 parallel to a XZ plane. The apexes of the folded portions are rounded by processing as shown in FIG. 9, and the rear ends (+Y side) thereof are almost on the same plane as the rear end of the bottom plate 71. The interval between the outer faces of the side plates 72 is set to be smaller than that between +X side face of the side plate 230 and −X side face of the medium plate 242a.

The front plate 73 is a thin plate fixed on the front (−Y axis) end of the bottom plate 71 and has, for example, eight through holes in two rows formed with a certain interval along the X axis, and two protrusions at both ends of the upper and lower half portions, respectively. The protrusions each include a through hole 80, one on −X axis side is screwed to the front panel via the through hole 80 and the other on +X axis side is screwed to the partition 240 via the through holes 80, 248.

The back plate 74 includes a rectangular opening 75 at a position corresponding to the HDD connector 64 of the HDD 60. The HDD 60 is accommodated in the tray 70 with the HDD connector 64 exposed outside of the chassis 200 via the opening 75. Further, the back plate 74 includes, for example, two protrusions at top end separately, and one of them has a reference hole 77 and the other has a hole 76 long along the X axis. The guide pins 28 are inserted into the reference hole 77 and long hole 76 when the tray 70 is accommodated in the chassis 200, and the tray 70 is positioned in the chassis 200 by the guide pins 280, reference hole 77 and long hole 76.

Next, an operation to mount the HDD module 300 in one area of the chassis 200 and connect the HDD connector 64 and the connector 264 of the connector substrate 260 is described. Although not shown in FIG. 8, the chassis 200 is fixed with screws in the housing 20 containing the body 30 or body frame 26.

Figure 8:
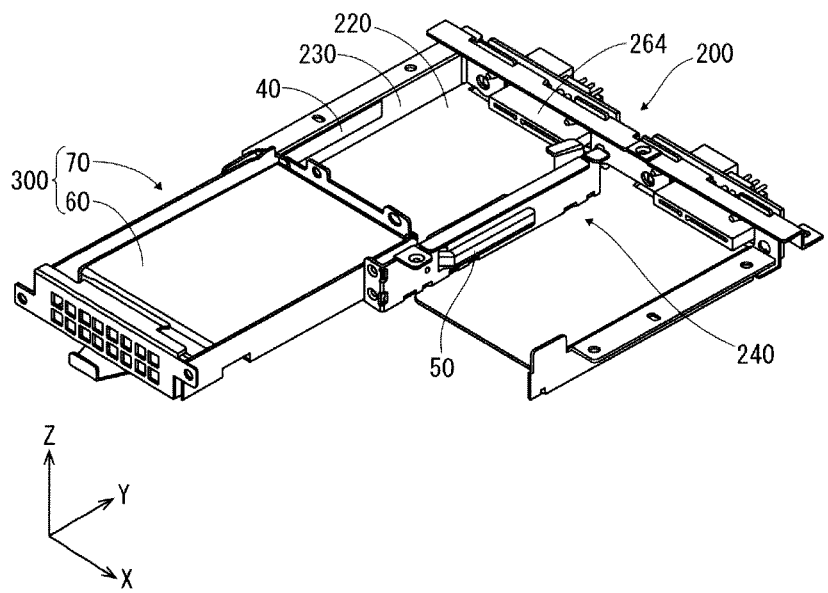
FIG. 8 shows the insertion of the HDD module to the tray.

As shown in FIG. 8, when the HDD module 300 is inserted into the chassis 200 from the −Y axis side and pressed on the bottom plate 220 to +Y axis direction, the folded portion 78 of the side plate 72 of the tray 70 is brought in contact with the conductive elastic element 50 in FIG. 9.

Figure 10:
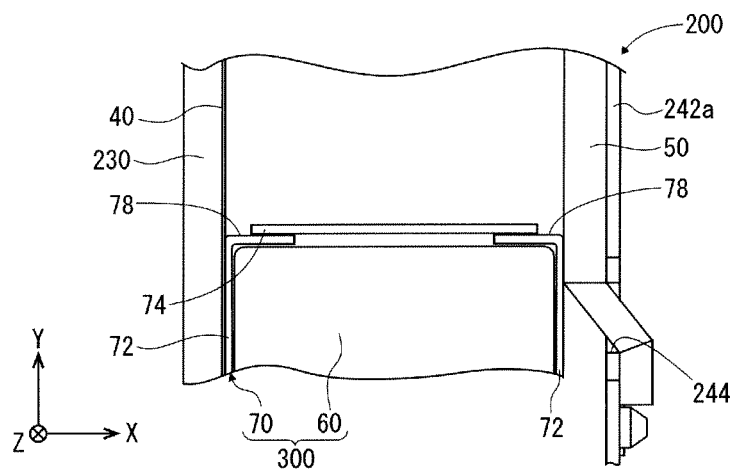
FIG. 10 shows the insertion of the HDD module to the tray.

Moreover, as shown in FIG. 10 the HDD module 300 is pressed by the conductive elastic element 50 to move along −X axis and the side plate 72 of the tray 70 is pressed onto the conductive tape 40. That is, the HDD module 300 is placed between the conductive elastic element 50 and conductive tape 40.

Then, the HDD module 300 is pressed further on +Y axis, whereby the guide pins 280 of the chassis 200 are inserted into the reference hole 77 and long hole 76 of the tray 70. With the HDD module 300 properly positioned by the guide pins 280, the HDD module 300 is further pressed to electrically connect the HDD connector 64 and the connector 264 of the connector substrate 260.

For removing the HDD module 300 from the chassis 200 and disconnecting the HDD 264 and the connector 264, the above operation is reversely performed so that a detailed description thereof is omitted.

As described above, according to the information processing unit 10 in the present embodiment, the HDD 60 is inserted or extracted into/from the body 30 or body frame 26 by hot plug via the adapter 100 including the chassis 200 and tray 70.

By use of the adapter 100 for the hot plug of the HDD 60, the tray 70 as a part of the HDD module 300 or the adapter 100 surface-contacts the conductive tape 40 and conductive elastic element 50. Thus, in the information processing unit 10, owing to the adapter 100, the HDD 60 can be easily, sufficiently connected to ground, and improved in tolerance against static electricity and EMI. Further, the vibration of the HDD module 300 or HDD 60 can be prevented or effectively reduced.

According to the adapter 100 in the present embodiment, one end of the conductive elastic element 50 is inserted in the notch 244 and opening 246 so that it can be prevented from peeling off when the HDD module 300 is inserted into the chassis 200. Accordingly, it eliminates the necessity for processing the shape of the conductive elastic element 50 not to peel off, resulting in reducing manufacturing costs.

Further, according to the adapter 100, the notch 244 and opening 246 are formed in the chassis 200 with a spacing from the front (−Y axis) end. Because of this, the HDD module 300 can be easily inserted into the chassis 200.

Furthermore, according to the adapter 100, the other end of the conductive elastic element 50 is placed in the chassis 200 with a spacing from the back (+Y axis) end. This can reduce a friction occurring at the insertion of the HDD module 300 into the chassis as well as a resistance of the guide pins 280 inserted into the reference hole 77 and long hole 76.

Furthermore, according to the adapter 100, it is made possible to set, to arbitrary values, the compression rate of the conductive elastic element 50 and the area in which the conductive elastic element 50 contacts the tray 70 by adjusting the length (on Y axis) and thickness (on X axis) thereof. Thus, by adjusting the friction resistance of the HDD module 300 when inserted into the chassis 200, the HDD module 300 can be easily inserted into the chassis 200.

Further, according to the adapter 100, the position of the tray 70 can be determined by the insertion of the two guide pins 280 into the reference hole 77 and transversely long hole 76. Because of this, the tray 70 can be easily positioned even if displacements of the center axis along the X axis or in θz direction (rotary direction around the Z axis) occur due to accumulated tolerances and shifts in inserted positions. Likewise, even with displacements of the center axis in other directions, the HDD module 300 can be easily positioned since the connector substrate 260 in which the guide pins 280 are secured is movably attached to the chassis 200 in XZ plane. That is, it is possible to decrease the vibration near the back end of the HDD module 300 by reducing the clearance between the guide pins 280 and the reference hole 77.

The above embodiment has described an example where one end of the conductive elastic element 50 is inserted into the notch 244 and opening 246 and the other end extends along the side surfaces of the medium plates 242a, 242b. The present invention should not be limited to such an example. For instance, in FIG. 11 another notch 249 same as the notch 244 can be formed behind the longitudinal center of the medium plates 242a, 242b, to insert the other end of the conductive elastic element 50 thereinto. This can prevent the other end of the conductive elastic element 50 from falling off when the HDD module 300 is pulled out of the chassis 200, even with a protrusion formed on the X-axis side face of the tray 70 which may hit the conductive elastic element 50.

The above embodiment has described an example where the conductive elastic element 50 is adhered onto the chassis 200, facing one X-axis side face of the tray 70. The present invention should not be limited to such an example. Alternatively, another conductive elastic element 62 instead of the conductive tape can be adhered onto the side plate 230 of the tray 70 to oppose the conductive elastic element 50, as shown in FIG. 12, for example. In this case one end (−Y axis) of the conductive elastic element 62 is inserted into a not-shown notch and adhered onto the outer side face of the side plate 230, as the conductive elastic element 50. With use of the conductive elastic element 62 in replace of the conductive tape 40, the HDD 60 becomes more unsusceptible to static electricity and EMI. Moreover, the width of the opening of the chassis 200 can be widened, leading to improving the workability for inserting the HDD module 300 or tray 70 into the chassis 200.

The above embodiment has described an example where the long hole 76 is long along the X axis. Alternatively, it can be long along the Z axis or in the direction orthogonal to the X axis and Z axis.

The above embodiment has described an example where one conductive elastic element is disposed on the Y axis. Alternatively, multiple elements, for example, two elements can be disposed with a certain interval along the Y axis.

The above embodiment has described an example where the two HDD modules or trays 70 are aligned with each other in the chassis 200. Alternatively, only one HDD module or three or more modules can be placed in the chassis.

The above embodiment has described an example where the HDD modules are accommodated in the two separate spaces of the chassis 200 along the X axis. The present invention should not be limited to such an example. An optical disc unit, flexible disc driver, or MO driver can be contained at least in either of the spaces.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An adapter to mount, in a housing, a device having a device connector, comprising: a tray to which the device is fixed; a chassis into which the tray is inserted from one direction, fixed in the housing; a connector substrate on which a connecter is mounted, attached to a back portion of the chassis in the one direction, the substrate connector of the substrate being connected to the device connector while the substrate connector is movable, via a floating nut, in a plane orthogonal to the one direction; and a first conductive elastic element attached on one portion of a first wall portion of the chassis, and disposed to extend in the one direction, wherein the first conductive elastic element is attached to the one portion of the first wall portion to be brought in sliding contact with the tray in the one direction and to press the tray and the substrate connector of the connector substrate to which the device connector is connected toward a second wall portion opposite the first wall portion, when the tray is inserted in the chassis and the device connector is connected to the substrate connector of the substrate.

2. An adapter according to claim 1, wherein:
the chassis includes either a first notch or a first opening in the first wall portion;
one end of the first conductive elastic element is disposed on the other side of the first wall portion through the first notch or first opening.

3. An adapter according to claim 2, wherein
the first notch or first opening is formed in the first wall portion at a position before a middle point in the insertion direction.

4. An adapter according to claim 2, wherein
the chassis includes either a second notch or a second opening in a back side of the first wall portion in the insertion direction;
both ends of the first conductive elastic element are disposed on the other side of the first wall portion through the first and second notches or the first and second openings.

5. An adapter according to claim 1, further comprising
a conductive element attached on the second wall portion opposing the first wall portion, wherein
the first conductive elastic element is placed in an area of the chassis except for a predetermined area at front and back sides of the first wall portion.

6. An adapter according to claim 1, further comprising
a second conductive elastic element attached on the second wall portion opposing the first wall portion symmetrically to the first conductive elastic element, wherein
the first conductive elastic element is placed in an area of the chassis except for a predetermined area at front and back sides of the first wall portion.

7. An adapter according to claim 1, wherein:
the connector substrate includes two guide pins;
the tray includes two holes into which the guide pins are inserted; and
one of the holes is circular and the other is transversely elongated.

8. An information processing unit comprising
a housing to accommodate either a hard disc unit or an optical disc unit; and
the adapter according to claim 1 to mount either the hard disc unit or optical disc unit in the housing.

* * * * *